Sept. 13, 1927.
J. ABRAHAMS
1,642,395
TOOL FOR THE REPAIR OF AUTOMOBILE TIRE SHOES
Filed April 12, 1927  2 Sheets-Sheet 1
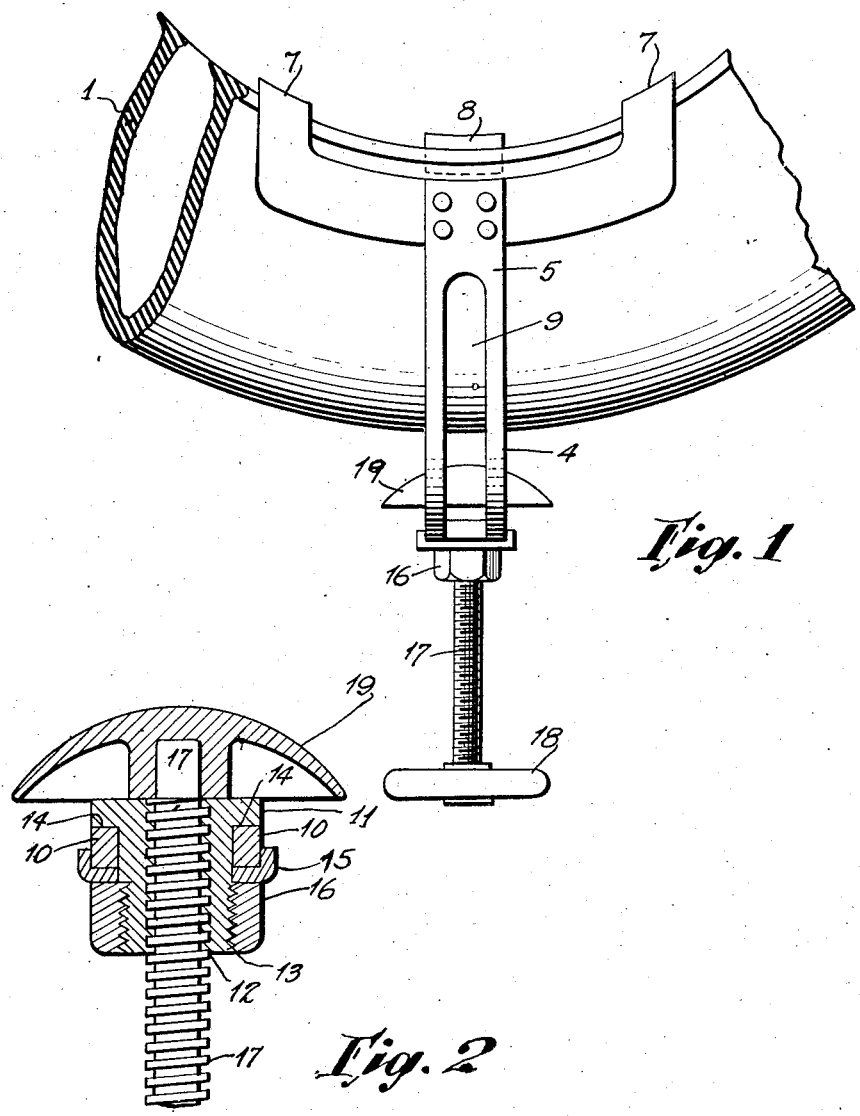
INVENTOR.
Jacob Abrahams
BY James L. Stewart
ATTORNEYS.

Sept. 13, 1927.  J. ABRAHAMS  1,642,395
TOOL FOR THE REPAIR OF AUTOMOBILE TIRE SHOES
Filed April 12, 1927    2 Sheets-Sheet 2
Fig. 3
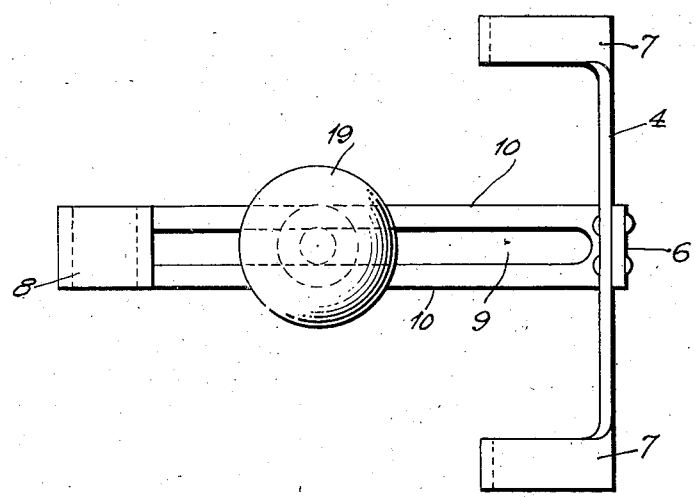
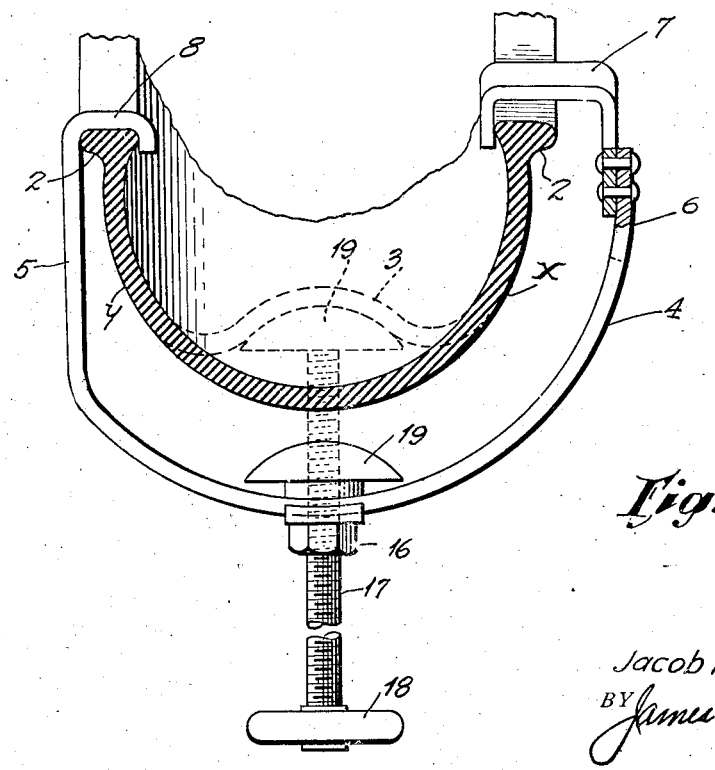
Fig. 4
INVENTOR.
Jacob Abrahams
BY James L. Stewart
ATTORNEYS.

Patented Sept. 13, 1927.

1,642,395

UNITED STATES PATENT OFFICE.

JACOB ABRAHAMS, OF BRADLEY BEACH, NEW JERSEY.

TOOL FOR THE REPAIR OF AUTOMOBILE TIRE SHOES.

Application filed April 12, 1927. Serial No. 183,059.

This invention relates to an improved tool adapted for use in the repair of automobile tire shoes.

It is common practice, when the shoe forming part of an automobile tire is blown out, cut or punctured, to disassemble the shoe from its associated rim, to cause the lips of the shoe to be drawn apart, and to compress the shoe from the periphery towards the annular axis of the shoe and, when so compressed, to cut away the injured part, forming preferably what are known as steps in the fabric of which the shoe is formed, to replace the injured part by a correspondingly formed plug or patch, then to retract the pressure on the periphery of the shoe with the patch or plug in position and vulcanize the same, thus accomplishing the repair.

Serious difficulty has been found in handling heavy shoes, such as are used on trucks or the like, for the reason that the shoes are heavy and therefore stiff and not easily flexed, and it is with great difficulty that suitable pressure can be exerted to depress the shoe at the point of fracture in such a way as to be able to operate on the same from the inside of the shoe.

It is also important to have a tool that may be positioned in radii of the annular axis of the tube, for the reason that punctures or blow-outs through the shoe are not always on the tread, but may be to the right or left of the tread or on the side of the shoe. It is therefore important to have a tool that is adjustable radially to the annular axis of the shoe so that the compression referred to may be brought to bear wherever the fracture has occurred in the shoe.

With the tool which is the subject matter of this application, it is possible to accomplish all of the desirable features above referred to.

The invention is illustrated in the accompanying drawings, in which

Figure 1 is a side elevation of a tire shoe, with the tool in position to operate;

Figure 2 is a sectional view through a block, which is the means employed for carrying the compression element, and which block moves in an annular path described by a slot in the tool;

Figure 3 is an elevation of the tool separate from the tire;

Figure 4 is a vertical section of the tire shoe, having associated therewith the tool which is the subject matter of this invention. In dotted lines in this drawing is shown the shoe compressed towards its annular axis in a position where a repair may be conveniently accomplished.

The elements of the tool are designated by numerals, like numerals referring to like parts.

1 is an automobile tire shoe. 2—2 are the annular beads of said shoe. 3 is a depression in the shoe, when operated upon by the tool, such depression being indicated in dotted lines.

The tool comprises a bifurcated element, indicated as 4, the bifurcated arms being designated as 5 and 6. 7 and 8 are hooks at the end of said bifurcated arms 5 and 6. An annular slot 9 is formed in said bifurcated element 4. 10—10 indicate the divided sections of the bifurcated element 4, between which lies the slot 9. 11 is a block adapted to receive the divided sections 10—10 of the bifurcated element 4. This block is so constructed that it can be moved in the arc of a circle, of which the annular axis of the shoe is approximately the center. Said block 11 is provided with a screw threaded aperture through its axis, adapted to receive a stem 17 externally threaded. 14—14 are recesses in said block to receive the sections 10—10 of the element 4. 15 is a washer. 16 is a nut operating on said washer. 17 is a screw-threaded shaft, screw threaded into an aperture in said block 11. 18 is a hand wheel for the operation of said screw. 19 is a hemispherical head mounted on the shaft 17.

The operation of the device is as follows: When it is desired to make a repair in the shoe, the shoe is expanded so that the hooks 7 and 8 will overhang the flanges 2—2 of the shoe. If the fracture, perforation or abrasion of the shoe is found in the tread, the block 11 is positioned with respect to the element 4 as indicated in the drawing, Figure 4. The hand wheel 18 is then rotated so as to project the screw in a direction radial to the annular axis of the shoe, thus driving the head 19 against the shoe, which is held in position by the hooks 7 and 8, thus causing the shoe to be depressed towards its annular axis, as indicated in dotted lines at 3. The fractured part is now depressed and distorted inwardly, and supported by the spherical head 19. In this position it can be readily operated upon by cutting away sufficient laminations of the shoe to form steps, or otherwise to satisfy the requirements of the plug or patch that may be applied to the injured part. When this is accomplished the screw 17 is retracted by the reverse movement of the hand wheel 18, and the shoe assumes its normal position with the plug or patch properly associated therewith. The shoe may then be treated by vulcanization or otherwise to restore it to its normal condition.

In the event that the damage to the shoe should be found to be located at any point in the arc of the circle of movement of the block, as at the point $x$, then the block is moved in the slot 9 between the walls 10—10 to a position radial to the annular axis of the shoe, passing through said point $x$. In this position, the same operation may be accomplished as that heretofore stated. If, on the other hand, the injury to the shoe is on the opposite side of the shoe from $x$, as $y$, in that event in applying the tool the hooks 7 and 8 are reversed in respect to their relation to the flange 2, thus making it possible to swing the block in an arc, which will bring the depressing apparatus opposite the point $y$.

In considering the merit of this invention it must be recalled that a tool of this nature is of essential importance in handling shoes of great weight and thickness, which cannot be depressed except by the employment of a powerful instrument such as that indicated; and it should also be recalled that the instrument is capable of operating on any part of the periphery of the shoe by so adjusting the block as to bring the compression mechanism in a predetermined position to accomplish the result desired.

What I claim is:

1. A tool adapted for use in the repair of automobile tire shoes, which comprises an annular bifurcated element provided with hooks at either end, said element adapted to embrace the shoe in a plane radial to the axis of the shoe, said hooks engaging the two inner edges of the shoe, said annular element having an annular slot lying in said radial plane, means adapted to compress said shoe from its periphery toward its annular axis, such means being mounted to move in said slot and to be positioned at any predetermined place in said slot.

2. A tool adapted for use in the repair of automobile tire shoes, which comprises an annular bifurcated element provided with hooks at either end, said element adapted to embrace the shoe in a plane radial to the axis of the shoe, said hooks engaging the two inner edges of the shoe, said annular element having an annular slot lying in said radial plane, means adapted to compress said shoe from its periphery toward its annular axis, such means being mounted to move in said slot and to be positioned at any predetermined place in said slot, said compression means comprising a block with a screw threaded shaft mounted for rotation in said block, and means for rotating said shaft, said shaft provided at one end with a hemispherical head adapted to engage the outer periphery of said shoe.

Signed by me at Bradley Beach, N. J., this 8th day of April, 1927.

JACOB ABRAHAMS.